Patented Aug. 24, 1948

2,448,002

UNITED STATES PATENT OFFICE 2,448,002

METHOD OF MAKING PROLAMINES

Leslie O. G. Pearce, Hammond, Ind., assignor to American Maize-Products Company, a corporation of Maine No Drawing. Application December 4, 1945, Serial No. 632,795

7 Claims. (Cl. 260—123)

This invention relates to prolamines and the method of separating them from other proteins. The invention relates, more particularly, to the separation of prolamines from crude cereal proteins containing originally a substantial proportion of starch.

Prolamines of kind heretofore known are insoluble in water, in alcohol containing less than 20% of water, and in calcium hydroxide solutions. They are soluble in alkali metal hydroxide or carbonate and in alcohol containing 20 to 30 parts of water to 100 parts of alcohol and water. The insolubility of prolamines in metal hydroxide solutions has been studied in detail by Walter J. Smith among others, and described in his thesis of 1933 at the Massachusetts Institute of Technology. In this thesis it is said on pages 1 to 10 that zein, the prolamine from corn gluten, for instance, dissolves in caustic alkali solutions but is not soluble in saturated calcium hydroxide solutions. The fact that the prolamines are soluble in an alcohol-water medium when the percentage of alcohol is 70 to 80% is stated in Hawk & Bergeim, Practical Physiological Chemistry, 11th ed., page 171.

The present invention provides a method of separating prolamines from cereal proteins which comprises converting the prolamines to a form in which they are soluble in calcium hydroxide solutions and, after liberation from the calcium complex in the solution, are soluble also in alcohol containing as little as 15% of water on the weight of the alcohol-water medium.

Briefly stated, the invention comprises the improved prolamine characterized by giving a clear solution with 85% alcohol and the herein described method of making such product. More specifically, the method of the invention includes dissolving the prolamines of a cereal protein in alkali metal alkali, such as sodium or potassium hydroxide or carbonate, and then replacing the alkali metal alkali of the resulting prolamine complex by calcium. The cereal protein containing prolamines is subjected to acid treatment before contact of the protein with the alkali metal alkali.

The reaction of an alkali with protein is commonly understood to give a salt of the protein with the metal of the alkali. In order, however, to avoid over-simplification of the explanation of the reaction of the alkali with the protein, it is now customary to refer to the product of the reaction as a complex of the protein and the metal of the alkali, the complex being understood to include all soluble derivatives formed by the metal and protein, in which metal salts of the proteins may predominate.

In general, the method of the invention is as follows.

The selected cereal protein is treated with the acid and then with sodium hydroxide or other alkali metal alkali to dissolve the prolamine content, the mechanism of the solution being described for convenience as the formation of a water soluble alkali metal complex of the prolamine.

To the resulting mixture of products there is then added a soluble calcium compound, as for example, the chloride, nitrate, or acetate, the chloride being preferred as it is entirely satisfactory and available at a low price. Although the calcium compound should be expected to react with the sodium hydroxide or the like present in such manner as to give a precipitate of calcium hydroxide, since the solubility of calcium hydroxide in water is less than 0.2 g. in 100 g. of water. The calcium compound should be expected also, in view of the known insolubility of prolamine in a saturated solution of calcium hydroxide, to form a precipitate of the calcium complex of the prolamines. While some excess calcium is precipitated as the hydroxide, much of the calcium goes to form a solution of the calcium complex of the prolamine. A small part of the calcium is utilized in precipitating calcium soaps of fatty acids and thus ridding the solution of these impurities.

This dissolved calcium complex is then separated from the remaining undissolved protein as by filtration, the term filtration being used herein to include such other satisfactory methods as centrifuging or decantation in which separation is effected without change of state and by relative movement of liquid with respect to solid particles.

The prolamine is then liberated from the filtrate as by acidifying with hydrochloric acid, dilute nitric acid, or dilute hydrobromic acid. The prolamine thus precipitated may then be and usually is separated from the remaining liquor by filtration, washed with fresh water, and dried.

The protein, before treatment with the alkali metal alkali, is predigested with acid, of which an aqueous solution of one of the strong acids described above is suitable. This digestion is effected under conditions that are usual in the acid hydrolysis of starch in the corn refining industry. The digestion renders the prolamine content more susceptible to attack by the alkali subsequently added, so that there is a large increase, due to the pretreatment with acid, in the yield of prolamines finally separated for a given weight of the cereal protein originally used.

This preliminary acid treatment serves an important function also in solubilizing starch which is ordinarily present in substantial proportion in the cereal proteins available at satisfactory prices for use in the preparation of the prolamine fraction.

In making this pretreatment of the protein and separation of starch from the cereal protein, a mixture of the acid and the protein is maintained at a temperature above the pasting point of the starch until the starch is hydrolyzed, as shown by the formation of no blue color when a drop of the composition is contacted with iodine in the usual test for starch. Obviously the higher the temperature used in this solubilizing of the starch, the shorter the time required. In any case the treatment is discontinued as soon as no further blue color develops on testing with iodine and before any substantial amount of the protein present is hydrolyzed to amino acids.

The solubilized starch is then filtered from the remaining protein. The remaining protein is neutralized with sodium carbonate or other alkali and is then treated with alkali metal alkali, such as sodium hydroxide, as the first step in the method described above.

The protein used is a cereal protein containing a high proportion of prolamines. Corn gluten which contains a large proportion of zein is particularly satisfactory for the present purpose. Other proteins that may be used are the gliadin of wheat and the hordein of barley.

The alkali metal alkali which is used to convert the prolamines to a complex with alkali metal is ordinarily alkali metal hydroxide, particularly sodium or potassium hydroxide. The corresponding carbonates may be used, however. The use of carbonates at this stage results in a greatly decreased yield of prolamines finally obtained and also requires the addition of lime as such. On the other hand, the use of carbonates gives more freely filtering solutions at intermediate stages in the manufacture.

When the original alkali used is carbonate, then it is necessary that the calcium compound added include calcium hydroxide and also a calcium salt. When the carbonate has been used to form the alkali metal prolamine complex, there is first added calcium hydroxide in approximately equivalent proportion so as to form, with the alkali metal carbonate, alkali metal hydroxide and calcium carbonate. Later there is added the calcium chloride or like soluble calcium salt.

The proportion of alkali metal alkali used, in forming the first complex of the prolamines, is that which is at least equivalent to the prolamines present, that is, adequate theoretically to convert all of the prolamines present to the alkali metal complex. Preferably there is used alkali in amount to establish the pH at 10.5 to 12.5 and for best results within the range of 11 to 12. This requires about 3 to 10 parts of sodium hydroxide or an equivalent amount of the other alkali metal alkalies for 100 parts of the cereal protein on the starch-free, dry basis and a concentration of dissolved sodium hydroxide or equivalent alkali of about 0.3 to 3 parts for 100 parts of the alkali solution in water.

The temperature at which the alkali metal alkali is maintained in contact with the cereal protein in forming the prolamine metal complex is moderately elevated as for instance, between 150° and 195° F. The lower the temperature, the longer the time required for the conversion of the prolamines to the dissolved complex. At temperatures much above 195°, objectionable decomposition of the protein begins to occur. Temperatures of about 175° to 188° F. give best results.

For best results, the time of contact of the alkali metal alkali with the prolamines is short, about 10 to 30 minutes or less at 180° to 188° F., for instance; the resulting solution is cooled before the soluble calcium compound is added; and the whole is again warmed and then caused to cool again.

The invention will be further illustrated by description in connection with the following specific examples of the practice of it.

Example 1

Four hundred parts by weight of corn gluten, in the usual subdivided condition in which it is recovered in the conventional wet milling of corn and in form containing about 60% protein and 40% starch, are mixed with 73 parts of 18° Bé. hydrochloric acid solution. The resulting mixture, of pH about 1 to 1.2, is warmed for 1 to 1½ hours at 205° F., after which test of the product with iodine shows that the starch has been converted to products which do not color iodine blue.

The acid treated material is then neutralized with the addition of sodium carbonate in slight excess.

The neutralized wet press cake so obtained is then filtered and the residue on the filter is washed with water. This leaves a wet press cake containing about 50% of water and containing the proteins of corn gluten in acid-treated and practically starch-free condition.

This treated corn gluten is then suspended in 2,000 parts of water. To the suspension there is then added 42 parts of a solution containing 48 parts of sodium hydroxide to 100 parts of water. The resulting mixture is then warmed to 180° to 188° F. and maintained at this temperature until substantially no more prolamine dissolves. This requires 15 minutes or so. The solution is then cooled to about 150° F.

To the solution of the prolamine sodium complex so obtained there is then added 33.5 parts of calcium chloride flakes containing approximately 80% of actual calcium chloride. This amount of calcium chloride is at least equivalent to the amount required theoretically to convert the prolamine content to the calcium complex and is also approximately equivalent to the sodium hydroxide originally used.

The mixture so made is then warmed, as to 192° to 194° F. momentarily. The solution is allowed to stand, suitably while cooling, for 3 to 5 hours, until the temperature reaches approximately room temperature, say not above 120° F. and preferably not above 100° F. Longer periods of cooling may be used, but give more decomposition of the dissolved calcium complex.

The cooled composition is then filtered and the residue washed. To the filtrate and washings there are added 59 parts of 18° Bé. hydrochloric acid to decompose the calcium complex and precipitate the zein, the pH of the composition after the addition of the hydrochloric acid being 4.1 to 4.2.

The precipitated zein is then filtered, washed and dried.

The ground product amounts to 125 parts and represents a yield of 90% or somewhat more of the theoretical zein content of the corn gluten.

Proportions given here and elsewhere herein are expressed as parts by weight unless specifically stated to the contrary. Also, in the several steps of this and other examples of the invention in which solid material is treated with a solution, the whole is preferably kept well mixed by mechanical agitation.

Example 2

This example is inserted to show the contrast between (1) the results obtained by the use of calcium hydroxide without previous treatment of the prolamine with sodium hydroxide and (2) the results with my new method in which the calcium compound is added only after previous treatment of the prolamine with an alkali metal alkali.

Six hundred parts of the neutralized wet press cake, obtained as described in the first part of Example 1 and containing about 50% by weight of solids on the dry basis, are stirred into 2,000 parts of water.

To this suspension there is then added 40 parts of calcium hydroxide suspended in 200 parts of water, the calcium hydroxide serving as the alkali to convert prolamine of the press cake directly to the calcium complex. The whole is stirred at room temperature for about 4 hours and then warmed gradually until the temperature reaches 200° F. at which time flocculation occurs.

The whole is then allowed to cool, say for 4 to 12 hours, to approximately room temperature.

The suspension is then filtered and the filtrate which contains the prolamine calcium complex is treated with dilute hydrochloric acid added in amount to establish the pH at about 4.1 to 4.2. This causes precipitation of the prolamine.

The precipitated material is then filtered, washed and dried.

The yield of prolamines was approximately 20% of the dry weight of the original corn gluten as compared to 31% in Example 1, in which there was first used sodium hydroxide and then an equivalent quantity of calcium chloride.

*Example 3*

The procedure of Example 1 is modified as follows.

The sodium hydroxide is replaced by an equivalent amount of sodium carbonate and the mixture warmed to 180° to 188° F. as above.

Instead of adding the calcium chloride direct to the alkali solution, calcium hydroxide in amount equivalent to the sodium carbonate is added to the wet press cake. This addition causes reaction with the sodium carbonate, with precipitation of calcium carbonate and the formation of sodium hydroxide. The latter is then available for action as an alkali upon the prolamines.

Finally, calcium chloride is added, as in Example 1 and in the same quantity, and the preparation is finished in the manner there described.

While the filtrations are more convenient and there is less degeneration of the protein when the carbonate is used as the alkali metal alkali in place of sodium hydroxide, the yield of finished separated prolamine is considerably reduced when the carbonate is used as the alkali to give the complex.

*Example 4*

To 300 parts of acid destarched gluten press cake suspended in 500 cc. water at 170° to 180° F. there are added 2,000 parts of an aqueous solution of sodium hydroxide of concentration 0.7%.

The resulting mixture is kept at 145° to 150° F. for one-half hour, then cooled with constant stirring to 90° F., this cooling being accomplished in 2 to 3 hours. The solution is then treated directly with 80% flake calcium chloride, or first passed through a high speed centrifuge of the usual type and the separated non-sludge fraction treated with the 80% flake calcium chloride. The mixture with the chloride is heated to 180° F., then cooled to 90° F. over a period of 3 to 5 hours, filtered, and the filtrate neutralized with dilute HCl to pH 4.0–4.2. The resulting prolamine is filtered off, and dried.

The method of this example gives the best yield, and with the least degradation of protein matter.

Prolamines made as described yield clear solutions in 85% alcohol. They are useful as coatings, as adhesives, and as pure prolamines as the starting material in making chemically modified products.

It will be understood that it is intended to cover all changes and modifications of the examples of the invention herein chosen for the purpose of illustration which do not constitute departures from the spirit and scope of the invention.

What I claim is:

1. In separating prolamines, the method which comprises subjecting a cereal protein containing the prolamines to hot acid hydrolysis and then maintaining the resulting insoluble products of the hydrolysis in contact with an alkali metal alkali in aqueous solution until the prolamines dissolve as an alkali metal complex, warming the said complex with an aqueous solution of a soluble calcium compound in proportion at least approximately equivalent to the prolamines present in the complex, this warming converting the complex to a soluble prolamine calcium complex, and then filtering the mixture to separate the prolamine calcium complex from any undissolved protein present.

2. The method described in claim 1, the alkali metal alkali being sodium hydroxide.

3. The method described in claim 1, the alkali metal hydroxide being sodium hydroxide, the calcium compound being calcium chloride, and the calcium chloride being used in proportion at least approximately equivalent to the sodium hydroxide used initially.

4. The method described in claim 1, the said alkali being an alkali metal carbonate and the calcium compound including calcium hydroxide and a soluble calcium salt added subsequently to the hydroxide, so that the hydroxide reacts with the carbonate to give calcium carbonate and an alkali metal hydroxide in advance of the addition of the calcium salt.

5. The method described in claim 1, the alkali used being an alkali metal hydroxide, the calcium compound being a calcium salt, the said filtrate being treated with acid in amount at least approximately equivalent to the metal present, to precipitate the prolamines, and the precipitate being then filtered, washed and dried.

6. The method described in claim 1, the mixture including the prolamine calcium complex being cooled to a temperature not substantially above 100° F. before the filtration is effected.

7. The method described in claim 1, the alkali metal alkali being an alkali metal hydroxide and the amount of the alkali metal hydroxide added being that which establishes the pH within the range 10.5 to 12.5.

LESLIE O. G. PEARCE.

REFERENCES CITED

The following references are of record in the file of this patent:

UNITED STATES PATENTS

| Number | Name | Date |
|---|---|---|
| 1,955,375 | Cone et al. | Apr. 17, 1934 |
| 2,271,620 | Brier et al. | Feb. 3, 1942 |
| 2,274,004 | Shildneck | Feb. 24, 1942 |
| 2,384,388 | Monte et al. | Sept. 4, 1945 |

OTHER REFERENCES

Osborne, "The Vegetable Proteins," Longmans, Green and Co., London (1924), pages 26 to 28. (Copy in Div. 15.)